UNITED STATES PATENT OFFICE.

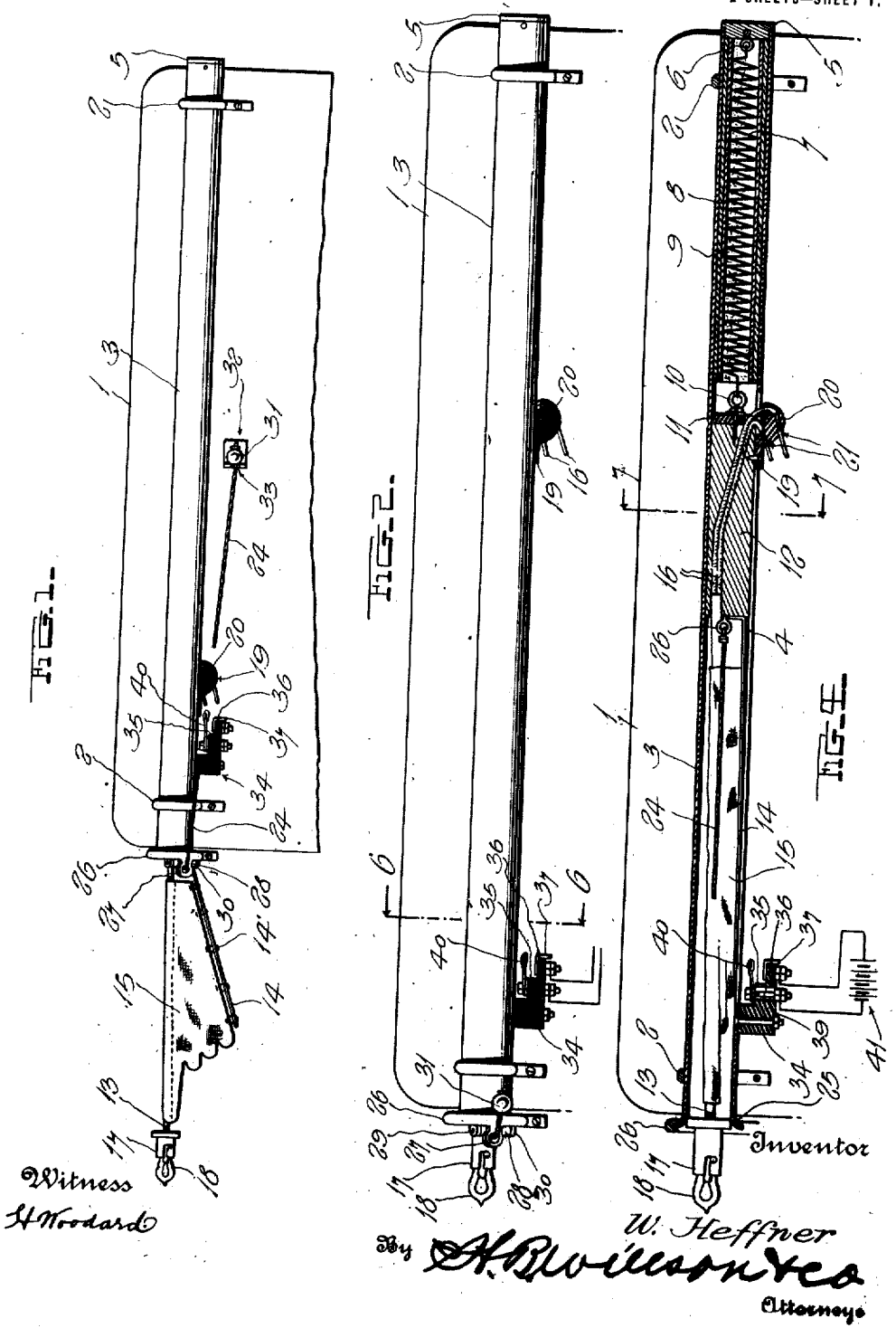

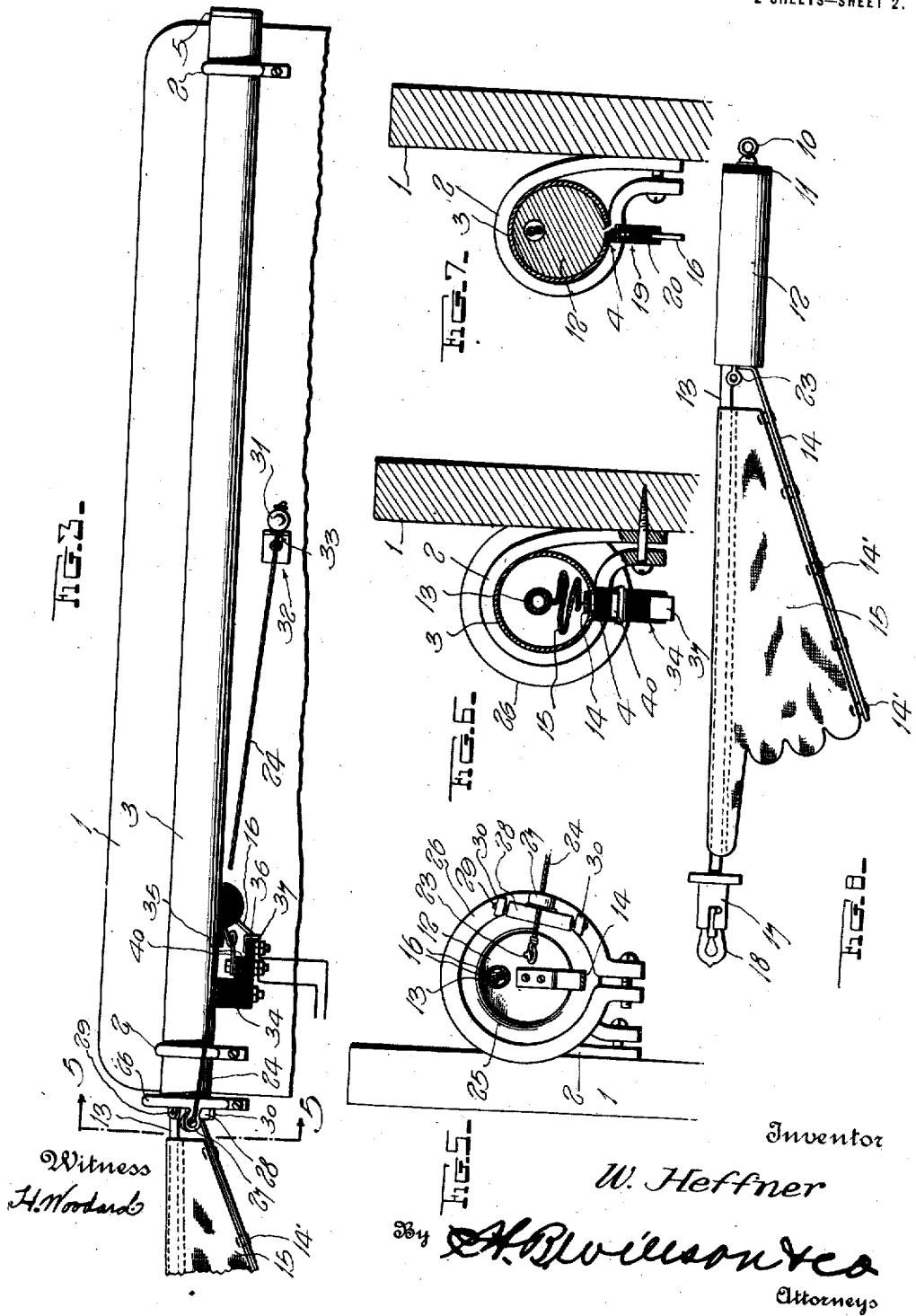

WILLIAM HEFFNER, OF BENTON HARBOR, MICHIGAN.

AUTOMOBILE-SIGNAL.

1,266,940.

Specification of Letters Patent.

Patented May 21, 1918.

Application filed April 5, 1917. Serial No. 159,966.

*To all whom it may concern:*

Be it known that I, WILLIAM HEFFNER, a citizen of the United States, residing at Benton Harbor, in the county of Berrien and State of Michigan, have invented certain new and useful Improvements in Automobile-Signals; and I do declare the following to be a full, clear, and exact description of the invention, such as will enable others skilled in the art to which it appertains to make and use the same.

My invention relates to automobile signals and more particularly to that class of signals which are designed to give warning to vehicles in the rear of the vehicle which is about to turn, by means of a signal displayed at the side of the front vehicle.

The object of my invention is to provide a signal of this character which can be operated from the dashboard of an automobile by the driver of the machine, and which will display a visual signal at one side of the machine, which signal may by further manipulation of the control by the operator of the machine, be used as an end signal without in any way changing the construction of the parts.

Another object of my invention is to provide a signal of this character which may be readily attached or detached from the wind shield of an automobile and is so constructed as to avoid any looseness of its parts which will cause the device to rattle when the machine is traveling over rough roads, thereby eliminating a great source of annoyance.

A further object is to provide in a signal of this character means whereby the control of the signal is so constructed that the minimum of wear on the parts thereof may be realized from the maximum of use.

A still further object of my invention is to provide an automobile signal which is cheap to manufacture and is readily applicable to any make of cars or to any type of vehicle on which it is desired to display a signal either at the side, front, or rear of the vehicle to indicate its direction of turning.

With these and other objects in view which will appear in the description, my invention consists in the novel combination, construction and arrangements of parts to be hereinafter described and claimed, and taken in connection with the accompanying drawings which form a part of this application and in which, Figure 1 is an elevation of my invention as applied to an automobile in extended position;

Fig. 2 is a similar view with the signal in inoperative position;

Fig. 3 is a side elevation showing the manner of securing the signal for night use;

Fig. 4 is a longitudinal central sectional view;

Fig. 5 is a detail sectional view on 5—5 of Fig. 3;

Fig. 6 is a transverse sectional view on 6—6 of Fig. 2;

Fig. 7 is a similar view on 7—7 of Fig. 4;

Fig. 8 is a side elevation of the interior parts of my signal.

Briefly describing my invention, the signal comprises substantially a casing adapted to be secured to the wind shield of an automobile in which is slidably disposed a plug carrying a flag on its outer end and which is so formed as to roughly represent the human hand, which plug is adapted to be moved within the casing to project the flag outwardly from the casing at one side of the machine. At the outer end of the flag is located a small electric light which can be brought into use at night time, forming a means of illuminating the signal and warning the driver of the car behind.

Means are provided between the plug and casing to guide the plug in the casing and prevent its turning, and suitable contacts are provided to close the circuit of the electric light at the end of the flag. These contacts are so constructed that they may be adjusted from time to time, thereby insuring a more efficient contact, and they are so arranged that the flag may be displayed without closing the circuit for the electric light or the flag may be displayed with the circuit to the light closed if so desired by the operator of the machine.

The means for projecting the flag outwardly at the side of the machine comprises a cord, wire or other flexible connector, attached at one end to the plug within the casing and having its free end disposed externally of the casing and provided with a suitable knob or ball to enable the operator to exert a pull upon the connector to project the flag outwardly. Located at a convenient point on the dash is a pivotally mounted retainer for the free end of the cord, and according to the position in which this retainer is disposed when the free end of the cord is engaged thereby, the signal is displayed with or without the circuit to the electric light closed. Means are also provided at the open end of the casing to prevent wearing away of the connector by contact with the sharp edge of the casing.

Referring more particularly to the drawings in which like reference numerals indicate like parts, I have shown my invention as applied on the interior of the wind shield of an automobile but it is obvious that it may be positioned at any point on the vehicle desired, as seen fit by the operator of the machine. The numeral 1 designates the interior of the wind shield of an automobile which is provided adjacent its sides with a pair of upstanding looped bracket members 2 which are adapted to receive therethrough a tubular casing member 3 having an open and a closed end. This casing 3 is constructed of any suitable material but, in my preferred form embodies a tube composed of brass or copper which is disposed with its open end adjacent the side of the machine on which it is desired to display the signal. Throughout a portion of its length the casing is provided with a longitudinally extending slot 4 which has one end terminating adjacent the open end of the casing but spaced considerably therefrom.

The opposite end of this casing is closed by a circular shouldered plate 5 which is either threaded into the end of the casing or secured thereto by a threaded pin extending through the side of the casing and into the plate or fastened in any suitable manner, and is provided at its central inner portion with a projecting apertured lug 6 to receive and retain one end of a coiled spring 7 extending into the casing. This spring is surrounded throughout its length by a wooden sleeve or casing 8 having a layer of felt or any suitable cloth 9 disposed between it and the circular wall of the casing 3, which construction serves not only as a guide for the spring when it is extended but serves to prevent any rattling of the spring within the casing, deadening any noise produced thereby.

The spring 7 extends for a portion of the length of the casing 3 and is connected at its opposite end to a hook member 10 having a swiveled connection with the retaining screw or bolt which is used to fasten an insulating plate 11 on the plug 12 disposed for sliding movement within the casing. This insulating plate 11 is formed with a recess in its face for a purpose to be hereinafter described and is constructed with its edges flush with the edges of the plug 12 so as to slide within the casing 3. At the opposite or outer end of this plug and at one side, there extends a hollow stem 13 and secured to the end face of the plug and bent upwardly therefrom and extending in the direction of the stem, is a spring tongue 14 which is normally held under tension by the adjacent wall of the casing, but which when released, tends to spring outwardly and away from the stem 13.

Between the stem 13 and the spring tongue 14 and secured thereto in any suitable manner, is a flag strip 15 which is so formed as to roughly indicate in outline a human hand with the index finger pointing in the direction the vehicle is about to turn. As this spring tongue 14 is forced inwardly against the shaft 13 to compress the flag therebetween when the signal is drawn back into the casing, it is obvious that the cloth of the flag strip would become worn against the sharp side edges of the tongue 14 when it came into contact with the wall of the casing. To avoid this difficulty and to eliminate any possibility of the strip becoming worn and cut in this manner, I have joined the strip to the inner face of the spring tongue by means of looped thread members 14′ which extend through perforations located at intervals along the face of the spring tongue. These looped thread members 14′ are formed of substantially stronger thread than that used in the construction of the cloth and are joined to the edge of the cloth by any suitable manner of stitching, so that when the spring tongue is forced downwardly by the edge of the casing, the side edges of the spring tongue will come into contact with the inner curved surface of the casing 3 without in any way bringing any part of the flag strip into contact with the inner surface of the casing or with the side edge of the spring tongue.

On the outer end of the stem 13 is suitably mounted and suitably insulated a socket 17 for the reception of a small incandescent bulb 18 which is brought into use to illuminate the signal at night. Connecting wires 16 extend from the socket through a hollow stem 13 and through a suitable bore provided in the plug 12, and are received through the insulating plate 11 and bent upwardly through the recess provided in this plate for a purpose to be hereinafter described. Secured on the plug 12 by any suitable manner of fastening which in this preferred form embodies an ordinary screw, is an insulating block or lug 19 which is so positioned as to extend upwardly through the slot 4 in the side of the casing, whereby to prevent the plug 12 from turning within the casing and act as a guide for the plug when it is moved longitudinally within the casing. Connecting wires 16 extend upwardly through an enlarged head 20 formed on the lug 19 and are positioned in bores 21 formed in the head, in such a manner that the free ends of the wires will project toward the open end of the casing at an upwardly inclined angle to the surface of the plug 12.

The spring, plug 12, stem 13, tongue strip, and electric bulb on the end of the stem, are all disposed normally within the casing 3 and are retained therein by a contraction of the spring 7. The operating means for projecting this signal member outwardly at the side of the machine, comprises an eye 23 secured on the outer end of the plug 12 having securely attached thereto one end of a cord or wire, or other suitable flexible connector 24, which is extended outwardly through the open end of the casing and disposed as will be hereinafter described. The open end of the casing 3 is preferably provided with an outwardly turned flange 25 surrounding the open end, on which is secured a clamping ring 26 provided with an upwardly extending eye 27 formed integrally on the clamp and having a cylindrical roller 28 disposed on the shaft 29 mounted between a pair of upstanding lugs 30 formed integrally on the perimeter of the clamping member 26.

The connector 24 is passed outwardly over the roller 28 and guided through the eye 27 formed on the clamp, which construction provides a means whereby the flexible connector will be at all times spaced from the sharp edge of the open end of the casing to prevent any wearing of the connector against the edge and also provides a means whereby the connector is guided from the open end of the casing, which means, as is readily seen owing to the clamp construction of the member 26, may be shifted to any point on the perimeter of the casing 3, as desired, in the manipulation of the control. The free end of the cord or connector 24 is provided with a suitable knob or ball 31 which in this preferred embodiment comprises a ball having a bore extending therethrough to permit movement of the ball with respect to the connector.

At any suitable point on the dash is located an L-shaped retaining member 32 provided with a notch 33 located in the top of the upstanding arm of the L and pivotally mounted on the dash by a bolt extending through the lower arm of the L and provided with an ordinary washer which is of familiar construction. Owing to these details of arrangements the upper arm of the L-shaped retaining member 32 may be swung from side to side for a purpose to be hereinafter described.

Secured on the outer surface of the casing 3 adjacent the open end of the casing and located at the end of and in alinement with the slot 4 which extends longitudinally in the casing, is a longitudinally extending contact block 34 secured to the casing in any suitable manner and provided with a stepped inner edge adjacent the surface of the casing to form contact arm holding portions 35 and 36. This contact block 34 as well as the lug 19 is formed of any suitable insulating material which in its preferred embodiment is constructed of fiber board. On the end portion 36 of this contact block 34 and extending on the under side of the block and bent upwardly around the end, is a contact strip 37 suitably secured to the block by means of an ordinary connector post. The middle portion 35 of the block is provided with a vertically extending longitudinally elongated bore 39, through which is extended any suitable type of bolt used in the ordinary construction of a connector post and which is adapted to secure a rearwardly extending contact arm 40 on the under side of the stepped portion 35 of the contact block. This contact arm 40 extends rearwardly over the longitudinally disposed slot 4 and is spaced between the contact strip 37 and the surface of the casing 3, and is provided with an inwardly turned lip formed on its free end, and in the preferred embodiment of my invention is composed of a thin strip of resilient brass.

Owing to the elongated construction of the bore 39 in the contact block 34, this strip 40 may be adjusted longitudinally with respect to the contact block. Suitable connecting wires are utilized to connect two binding posts on the contact block 34 with a suitable current source which in this embodiment of my invention comprises an ordinary dry cell battery 41 located at any desired point in the machine.

In the operation of my device, when all parts of the signal are in their normal positions, the connector cord or wire is of sufficient length as to allow of the knob on the free end of the connector being disposed externally of the casing and slightly beyond the open end thereof. When it is desired to actuate the signal, the operator of the machine will draw the connector inwardly by means of the knob on the free end which will in turn project the signal member outwardly at the side of the machine as the plug carrying the stem and spring tongue with the flag interposed therebetween is moved outwardly within the casing against the tension of the coiled spring hereinbefore described, which is disposed at the opposite end of the casing. If it is merely desired to use the signal arm as a daylight signal, the L-shaped retaining member is positioned with its upstanding arm disposed on the side of the machine at which the signal is displayed, and owing to the spaced arrangement of the different parts of my invention, more particularly the construction of the contact blocks or wires, the stem carrying the flag will project outwardly beyond the casing in operative position without bringing the wires carried by the lug on the inner end of the plug which is slidable on the interior of the casing into contact with the contact block secured on the outer face of the casing, as described above.

The knob on the end of the connector is positioned adjacent the upwardly extending arm of the retaining member with the connector itself disposed in the notch in the upper portion of the arm, whereby the signal will be secured in operative position, and when it is no longer desired to use the signal the signal may be lifted out of engagement with the notch whereby the coiled spring disposed within the casing will cause the entire signal to be drawn inwardly and enveloped within the casing. On cloudy days and for night use, when it is desired to illuminate the signal, the retaining member is turned so as to dispose the upper arm of the member toward the side of the machine opposite to that from which the signal is to be displayed, and when the connector cord is drawn outwardly and the ball disposed in engagement with the retainer, the additional outward travel of the signal member consequent upon positioning the knob on the end of the connector in the retainer as it is now positioned, is sufficient to allow of the inclined projecting ends of the wires extending through the lug which is positioned in the slot disposed in the casing and secured to the plug within the casing, to be brought into contact with the contact strip and spring contact arm respectively located in the contact block disposed on the outer surface of the casing, whereby to complete the circuit to the incandescent bulb carried on the extreme end of the signal, thereby illuminating the signal as desired.

When the signal member is projected outwardly under the action of the connecting cord or wire, the resiliency of the spring tongue having the flag strip secured thereto will cause the said strip to expand and assume the outline of a human hand having the index finger thereof pointing in the direction in which it is desired to turn the machine, and when the signal member is retracted within the casing, the spring tongue will be compressed against the edge of the casing, whereby to cause the flag to fold upon itself and be enveloped within the casing.

While I have shown and specifically described in detail certain materials and parts used in the construction of my invention, it is obvious, and I desire to point out, that I do not wish to limit myself to the particular construction and specific materials as herein described, but that many changes may be made in the minor details of construction of my signal as may fall within the scope of the appended claims.

I claim:—

1. In a device of the character described, the combination of a casing adapted to be attached to a vehicle, a plug slidable within said casing, a rigid stem extending outwardly from said plug, a spring disposed between said plug and the inner end of said casing to normally hold said plug and stem within the casing, a leaf spring secured at one end to said plug and extending parallel with said stem, said leaf spring normally retained under tension by contact with the wall of said casing, a flag strip secured to said leaf spring and stem whereby when said plug is moved outwardly from the casing the flag strip will be distended, and operating means secured to said plug and disposed externally of the casing to project said signal member into operative position.

2. In a device of the character described, a tubular casing to be disposed on a vehicle having one of its ends open, a plug slidable within said casing, signaling means carried by a stem extending outwardly from said plug, a spring disposed between said plug and the inner end of said casing to normally hold said plug and stem within the casing, a tubular cushioning member disposed between the wall of said tube and said spring whereby to prevent any rattling of the spring and operating means extending outwardly from said casing whereby the signal may be projected into operative position.

In testimony whereof I have hereunto set my hand in the presence of two subscribing witnesses.

WILLIAM HEFFNER.

Witnesses:
 JOHN N. PANNDSTONE,
 HARRY F. METZGER.